US00RE33877E

United States Patent [19]

Sappington

[11] E Patent Number: Re. 33,877

[45] Reissued Date of Patent: Apr. 7, 1992

[54] FUSE BLOCK WITH REJECTION FEATURE

[75] Inventor: Gayle L. Sappington, Glendale, Mo.

[73] Assignee: Cooper Industries, Inc., Houston, Tex.

[21] Appl. No.: 559,689

[22] Filed: Jul. 26, 1990

Related U.S. Patent Documents

Reissue of:

[64] Patent No.: 4,761,148
Issued: Aug. 2, 1988
Appl. No.: 464,701
Filed: Feb. 7, 1983

[51] Int. Cl.[5] ..... H01R 13/00
[52] U.S. Cl. ..... 439/831
[58] Field of Search ..... 439/620–622, 439/680, 831; 337/210, 214, 215, 225, 226, 262

[56] References Cited

U.S. PATENT DOCUMENTS

Re. 30,862 2/1982 Mrenna et al. .
3,585,558 6/1971 Swain .
3,813,626 5/1974 Cetola et al. .
3,879,695 4/1975 Oakland et al. .
3,960,435 6/1976 Bailey et al. .
4,052,688 10/1977 DeNigris et al. .
4,097,114 6/1978 Motten, Jr. .
4,108,531 8/1978 Reynolds .
4,178,063 12/1979 Reynolds .
4,257,662 3/1981 Motten, Jr. .
4,278,316 7/1981 White .

FOREIGN PATENT DOCUMENTS 623638 12/1935 Fed. Rep. of Germany .
2031235 4/1980 United Kingdom .

*Primary Examiner*—Joseph H. McGlynn
*Attorney, Agent, or Firm*—David A. Rose

[57] ABSTRACT

A rejection-type fuse block is disclosed for use with Class CC cartridge-type fuses having ferrules at opposite ends, the ferrule at one end having a cap of smaller diameter than the ferrule. An insulated rejection collar having a rejection opening sized to allow the cap to pass therethrough while preventing passage of the ferrule is positioned between the fuse and an electrically conductive terminal. A leaf spring located at the end of the fuse opposite the cap end serves to axially press the fuse towards the insulated rejection collar and the cap into contact with the terminal. Fuse clips are provided for releasably securing the clip in proper position.

18 Claims, 1 Drawing Sheet

FIG. 1
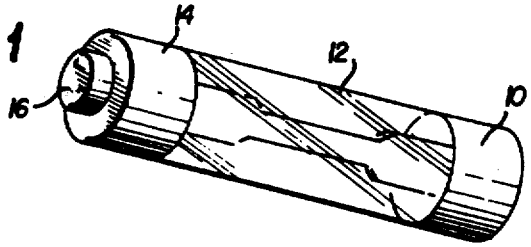
FIG. 2
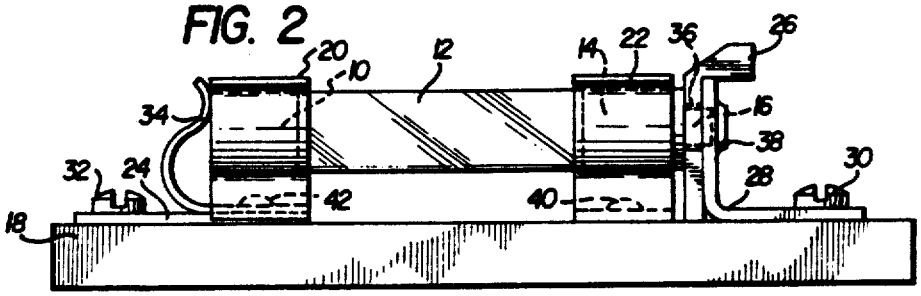
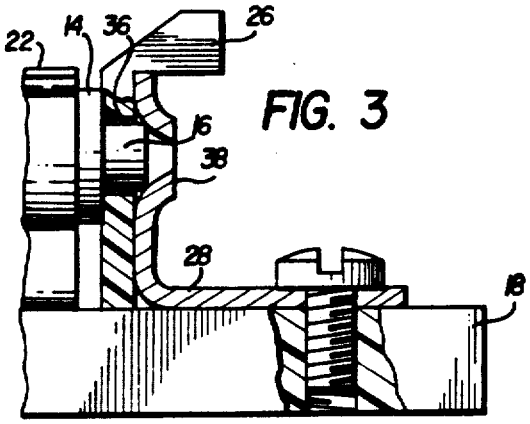
FIG. 3
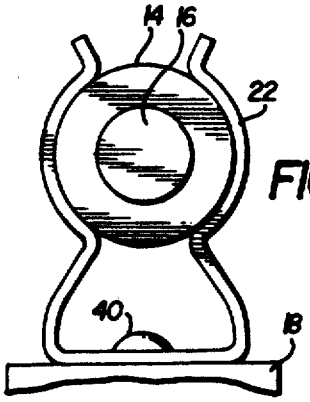
FIG. 4
FIG. 5
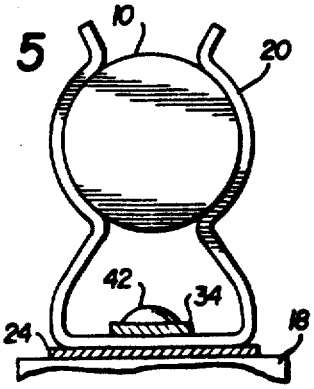
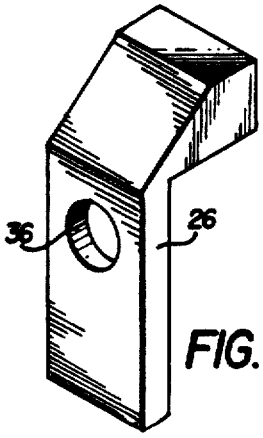
FIG. 6
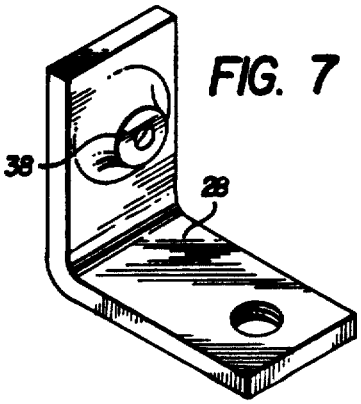
FIG. 7

FUSE BLOCK WITH REJECTION FEATURE

Matter enclosed in heavy brackets [ ] appears in the original patent but forms no part of this reissue specification; matter printed in italics indicates the additions made by reissue.

BACKGROUND OF THE INVENTION

Standards for fuses in the United States provide for different interrupting capacity fuses having generally the same exterior dimensions, specifically length and diameter. In such cases it is the practice to provide a rejection feature in both the fuses and the fuse blocks such that in the case of like dimension fuses, those having a lower interrupting capacity are prevented from being inserted in a fuse block specifically designed for those having a higher interrupting capacity. For example, one form of rejection feature well known in the art is to use ferrule-type fuses with an annular groove in the ferrule at one end of the fuse. Various fuse blocks are known in the art which will accept a fuse of predetermined higher interrupting capacity but will reject a fuse of like dimension but of lower interrupting capacity. Examples of this type of fuse block are disclosed in U.S. Pat. Nos. 4,257,662 to Matten, 4,097,114 to Matten, 3,960,435 to Bailey et al. and 4,178,063 to Reynolds.

Another form of rejection feature is provided for Class CC fuses in which one end of a fuse is configured with a ferrule having a concentric cap of lesser dimension than the ferrule. A fuse having this form of rejection feature and a fuse clip for accepting fuses with this feature while rejecting other tpes of fuses are disclosed in U.S. Pat. No. 3,585,558 to Swain which teaches the use of a fuse block having a pair of spaced fuse clips with rejection abutments. Also of interest is the Underwriters Laboratory standard for Class CC Fuseholder Ferrule Contact-Type Rejection Member, UL 512, as described at page 8D therein. In accordance with the Underwriters Laboratory standard a fuse clip with end stops is used in combination with a rejection stop and terminal. A disadvantage of both the Swain and Underwriters Laboratory arrangements is that the dimensional tolerance of the overall length of the fuse and the fuse block must be carefully controlled. A further disadvantage of the Swain arrangement is that while it prevents the insertion of the incorrect fuse, it allows electrical contact during an attempt to insert an incorrect fuse.

SUMMARY OF THE INVENTION

The fuse block of the present invention is for use with Class CC fuses and having a rejection feature. In accordance with the invention the fuse block is provided with an insulating column designed to act as a rejection spacer between the concentric cap of the ferrule on one end of the fuse and the electrical contact terminal of the fuse block. The fuse is positioned and retained in electrical contact by means of a retaining leaf spring which applies pressure to the fuse in the direction of the contact terminal. This novel arrangement substantially reduces the requirement of tight dimensional tolerance control.

An object of the present invention is to provide a fuse block with rejection means for use primarily with Class CC fuses.

A further object of the present invention is to provide a rejection fuse block which prevents electrical contact upon insertion of an improper fuse.

Another object of the present invention is to provide a rejection-type fuse block allowing greater dimensional tolerance.

Still another object of the present invention is to provide a rejection-type fuse block including means for applying pressure to the fuse in the direction of the contact terminal.

Yet another object of the present invention is to provide a fuse block with both rejection and retention features in which the retention means is not subjected to heating due to heavy current flow.

Other objects and features of the present invention will become apparent with reference to the accompanying drawings and description.

BRIEF DESCRIPTION OF THE DRAWINGS

FIG. 1 is a perspective view of a Class CC cartridge-type fuse;

FIG. 2 is a side view of a fuse block of the present invention;

FIG. 3 is a detailed view, partially in cross-section, of the rejection means of the fuse block of FIG. 2;

FIG. 4 is an end view of the rejection end dummy fuse clip of the fuse block of FIG. 2;

FIG. 5 is an end view of the non-rejection end fuse clip of the fuse block of FIG. 2;

FIG. 6 is a perspective view of the rejection collar of the fuse block of FIG. 2; and FIG. 7 is a perspective view of the rejection end terminal of the fuse block of FIG. 2.

DETAILED DESCRIPTION OF THE INVENTION

The rejection feature of a Class CC fuse can be understood by reference to FIG. 1. As shown, the Class CC fuse comprises a non-rejection terminal 10 in the form of a ferrule which is well known in the fuse art, a body portion 12 in which the fusible element is contained, and a rejection end terminal having the form of a ferrule 14 with a cap 16. Cap 16 is arranged concentric to ferrule 14 and is of similar diameter than ferrule 14. The ferrule 14 with cap 16 provides the rejection feature.

FIG. 2 illustrates the features of the fuse block of the present invention. A Class CC fuse is depicted inserted into a fuse block constituting a preferred embodiment of the present invention. The non-rejection terminal 10 is held by fuse clip 20, and axial pressure is applied to the same terminal by leaf spring 34. Both the fuse clip 20 and leaf spring 34 are positioned on a conductor element 24 and secured in place on a fuse block base 18 by rivet or screw 42. Both the fuse clip 20 and leaf spring 34 are connected to an electric circuit by means of terminal screw 32. However, the leaf spring 34 preferably has a high electrical resistance such that current flow in the leaf spring is minimal. The high electrical resistance of leaf spring 34 assures that the leaf spring will not experience stress relaxation caused by heat generated by high current flow which would tend to reduce contact pressure at the rejection end terminal cap 16.

Rejection end ferrule 14 is held by a clip 22, termed a "dummy clip" since the clip is not arranged for electrical current to flow therethrough. Clip 22 is secured to base 18 by rivet 40. The function of dummy clip 22 is to hold the ferrule 14 in proper alignment on the base 18 and to center the ferrule with respect to a rejection opening 36 in rejection collar 26. Clip 22 further functions to drain heat from the Class CC fuse.

Rejection end terminal 28, which may be connected into an electric circuit by screw 30, provides electrical connection to the Class CC fuse via contact with cap 16 which is forced through rejection opening 36 in rejection collar 26 into contact with terminal 28 by the axial pressure applied by leaf spring 34. Rejection collar 26, located adjacent to and in contact with terminal 28, is composed of electrically insulating material thereby preventing a fuse from making electrical contact unless the fuse is of the Class CC-type with a cap 16 of sufficiently small cross-section to pass through the rejection opening 36. Thus, even though a non-Class CC fuse can be inserted into the fuse block of the present invention, the non-Class CC fuse will not close the circuit due to the presence of insulating rejection collar 26.

Normally, prior art fuse clips have stops to position fuses. Therefore, the manufacturing tolerance in the overall length of the fuse and in the lateral separation of the clips is critical. In the present invention, stops are not required either in fuse clip 20 or in dummy clip 22 since the axial positioning of the fuse is controlled by leaf spring 34, terminal 28 and rejection collar 26. Leaf spring 34 is designed to provide sufficient pressure on a minimum length fuse and to not take a permanent set when the fuse is at the maximum allowed length.

Details of the rejection end assembly of the present invention, namely, the dummy clip 22, rejection collar 26, terminal 28, and fuse rejection end terminal comprising ferrule 14 and cap 16, is shown partially in cross-section in FIG. 3. Cap 16 is forced through rejection opening 36 in rejection collar 26 and into contact with terminal 28 in a pocket 38 in the terminal. Rejection collar 26 can be secured to base 18 by any of several known means without departing from the spirit of the invention since rejection collar 26 is effectively colligated with terminal 28 and is supported against lateral pressure by terminal 28. The collar 26 may be secured to the base 18 by adhesive, or alternatively the collar 26 may be molded as an integral part of the base 18.

FIG. 4 is an end view of dummy clip 22 with an inserted Class CC fuse. Ferrule 14 and concentric cap 16 are positioned by clip 22 to align cap 16 with rejection opening 36 as shown in FIG. 3.

FIG. 5 is an end view of non-rejection end clip 20. Ferrule 10 is positioned by clip 20. Due to pressure from leaf spring 34, shown in FIG. 2, no stops to control axial positioning of the fuse are required in clip 20.

Perspective views of rejection collar 26 and rejection end terminal 28 are shown in FIGS. 6 and 7 respectively. Rejection opening 36 is sized to pass cap 16 as shown in FIGS. 2 and 3 but to prevent the passage of ferrule 14. Terminal 28 includes pocket 38 for providing a positive connection for cap 16 as shown in detail in FIG. 3. In the preferred embodiment of the present invention, rejection collar 26 and terminal 28 are arranged in an effectively colligated manner as shown in FIG. 3.

While the preferred embodiment of the present invention is described herein, it should be understood that modifications thereof are within the scope and spirit of the invention disclosed and claimed.

What is claimed is:

1. A rejection fuse block for a cartridge-type fuse having electrical contact elements at opposite ends, the contact element at one end including a cap, said cap having a smaller cross-sectional width than the adjacent portion of said fuse contact element; said fuse block comprising:

(a) support means;

(b) electrically conductive means mounted on said support means and having a surface for contacting said cap at said one end of said fuse and making a first electrical connection with said fuse;

(c) electrically insulated rejection means colligated with said surface of said electrically conductive means, said rejection means having a rejection opening sufficiently large to pass said cap portion therethrough into contact with said electrically conductive means but smaller than the adjacent portion of said fuse contact element to prevent passage therethrough of said adjacent portion;

(c) means mounted on said support means for contacting the contact element at the opposite end of said fuse to make a second electrical connection with said fuse and for biasing said fuse towards said electrically insulated rejection means to force said cap into contact with said electrically conductive means; and (d) dummy fuse clip means, said dummy clip means releasably retaining said one end of said fuse such that said cap is in alignment with said rejection opening in said rejection means, said dummy clip means being electrically insulated from said electrically conductive means.

2. The fuse block of claim 1 wherein said means for contacting the contact element at the opposite end of said fuse and for biasing said fuse towards said electrically insulated rejection means comprises a fuse clip for releasably retaining said contact element at the opposite end of said fuse and a leaf spring arranged to contact said contact element at the opposite end of said fuse and bias said fuse towards said electrically insulated rejection means.

3. The fuse block of claim 1 wherein said electrically conductive means having a surface for contacting said cap defines a pocket for receiving said cap therein to provide an electrical connection.

4. The fuse block of claim 2 wherein said leaf spring is composed of a material having a lower electrical conductivity characteristic than that of said fuse clip.

*5. A rejection fuse block for a cartridge-type fuse having electrical contact elements at opposite ends, the contact element at one end including a cap, said cap having a smaller cross-sectional width than the adjacent portion of said fuse contact element; said fuse block comprising:*

*(a) support means;*

*(b) electrically conductive means mounted on said support means and having a surface for contacting said cap at said one end of said fuse and making a first electrical connection with said fuse;*

*(c) electrically insulated rejection means colligated with said surface of said electrically conductive means, said rejection means having a rejection opening sufficiently large to pass said cap portion therethrough into contact with said electrically conductive means but smaller than the adjacent portion of said fuse contact element to prevent passage therethrough of said adjacent portion;*

*(d) means mounted on said support means for contacting the contact element at the opposite end of said fuse to make a second electrical connection with said fuse and for biasing said fuse towards said electrically insulated rejection means;*

(e) *insulative guide means engageable with the adjacent portion to center said gap with said electrically conductive means; and*

(f) *said electrically conductive means further including retention means for providing a positive connection with the cap.*

*6. The rejection fuse block of claim 5 wherein said retention means includes a pocket in said surface of said electrically conductive means to positively connect the cap.*

*7. The rejection fuse block of claim 5 wherein said guide means includes an insulative stop engageable with the adjacent portion to limit the movement of the cap towards said support means and opposing insulative sides engageable with the adjacent portion for the centering of the cap.*

*8. A rejection fuse block for a cartridge-type fuse having a rejection terminal on one end and a non-rejection terminal at the other end, the rejection terminal having a cap with a smaller cross-sectional width than the adjacent portion of the rejection terminal, said fuse block comprising:*

*an insulating support base;*

*a first electrically conductive means mounted on said support base and having an electrical contact for contacting the cap and making a first electrical connection with the fuse;*

*an electrically insulated rejection member adjacent said electrical contact, said rejection member having an opening sufficiently large to pass the cap therethrough into contact with said electrical contact but smaller than the adjacent portion of the fuse rejection terminal to prevent passage therethrough of the adjacent portion;*

*a second electrically conductive means mounted on said support base for contacting the non-rejection terminal of the fuse to make a second electrical connection with the fuse;*

*biasing means mounted on said support base for biasing the adjacent portion of the fuse rejection terminal against said electrically insulated rejection member;*

*insulative alignment means engaging opposite sides of the adjacent portion for centering the cap with said electrical contact; and*

*said electrical contact having a pocket to retain the cap.*

*9. The rejection fuse block of claim 8 wherein said rejection member is made of a dielectric material.*

*10. The rejection fuse block of claim 8 wherein said second electrically conductive means is a fuse clip releasably retaining the non-rejection terminal.*

*11. The rejection fuse block of claim 8 wherein said opening is aligned with said pocket.*

*12. The rejection fuse block of claim 8 wherein said alignment means also retains the adjacent portion.*

*13. The rejection fuse block of claim 8 wherein said rejection member spaces the cap from said electrical contact.*

*14. The rejection fuse block of claim 8 wherein said insulative alignment means is made of metal and is electrically insulated from said first electrically conductive means.*

*15. The rejection fuse block of claim 14 wherein said metal alignment means acts as a heat sink to dissipate excess heat generated by the fuse.*

*16. The rejection fuse block of claim 8 wherein said biasing means is a leaf spring.*

*17. The rejection fuse block of claim 16 wherein said leaf spring is made of a material with an electrical resistance high enough to sufficiently reduce current flow therethrough to prevent stress relaxation in said leaf spring.*

*18. A fuseholder for a fuse having a rejection ferrule on one end and a non-rejection ferrule on the other end, the rejection ferrule having a cap arranged concentrically with the rejection ferrule and having a smaller diameter than the rejection ferrule, comprising:*

*an insulative base;*

*an electrically conductive contact mounted and projecting from one end of said base and having a pocket for receiving and retaining the cap for making a first electrical connection with the fuse;*

*an electrically conductive fuse clip mounted and projecting from the other end of said base for receiving and retaining the non-rejection ferrule and for making a second electrical connection with the fuse;*

*an insulative member projecting from said base between said fuse clip and contact, said member having an opening aligned with said pocket for receiving the cap but not the rejection ferrule;*

*biasing means adjacent said fuse clip for axially biasing the rejection ferrule against said insulative member;*

*an insulative stop projecting from said base engageable with the rejection ferrule for limiting the movement of the rejection ferrule towards said base; and*

*centering means projecting from said base engageable with the rejection ferrule for centering the cap with said opening and contact.*

* * * * *